(12) United States Patent
Geddes

(10) Patent No.: US 7,853,782 B1
(45) Date of Patent: Dec. 14, 2010

(54) SECURE INTERMEDIATION SYSTEM AND METHOD

(75) Inventor: Martin Geddes, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2009 days.

(21) Appl. No.: 10/824,236

(22) Filed: Apr. 14, 2004

(51) Int. Cl.
G06F 21/00 (2006.01)
H04L 29/06 (2006.01)

(52) U.S. Cl. .................. 713/151; 713/153; 705/78; 705/79

(58) Field of Classification Search .......... 713/182, 713/164, 165, 166, 167, 151, 153; 705/64, 705/77, 78, 79
See application file for complete search history.

(56) References Cited

U.S. PATENT DOCUMENTS

| | | | |
|---|---|---|---|
| 5,077,790 A | 12/1991 | D'Amico et al. | |
| 5,351,235 A * | 9/1994 | Lahtinen | 370/259 |
| 5,621,727 A * | 4/1997 | Vaudreuil | 370/401 |
| 5,708,780 A | 1/1998 | Levergood et al. | |
| 5,764,188 A | 6/1998 | Ghosh et al. | |
| 5,908,469 A | 6/1999 | Botz et al. | |
| 5,930,777 A | 7/1999 | Barber | |
| 5,933,498 A | 8/1999 | Schneck et al. | |
| 5,961,593 A | 10/1999 | Gabber et al. | |
| 6,029,141 A | 2/2000 | Bezos et al. | |
| 6,035,281 A | 3/2000 | Crosskey et al. | |
| 6,037,935 A | 3/2000 | Bates et al. | |
| 6,052,730 A | 4/2000 | Felciano et al. | |
| 6,092,196 A | 7/2000 | Reiche | |
| 6,101,510 A | 8/2000 | Stone et al. | |
| 6,112,242 A | 8/2000 | Jois et al. | |
| 6,121,970 A | 9/2000 | Guedalia | |
| 6,134,680 A | 10/2000 | Yeomans | |
| 6,161,185 A | 12/2000 | Guthrie et al. | |
| 6,178,511 B1 | 1/2001 | Cohen et al. | |
| 6,195,545 B1 | 2/2001 | Baker et al. | |

(Continued)

FOREIGN PATENT DOCUMENTS

WO WO 9843177 10/1998

(Continued)

OTHER PUBLICATIONS http://developer.netscape.com/docs/manuals/security/sslin/contents.htm, Oct. 9, 1998.

(Continued)

*Primary Examiner*—Gilberto Barron, Jr.

(57) ABSTRACT

In a secure intermediary system, an intermediary is positioned along a communications path between a client and a server. The client sends a request to enter into a secure session, such as a secure socket layer (SSL) session. The intermediary receives the session request and establishes a first secure session between the client and the intermediary and/or a second secure session between the intermediary and the server. After the first and second secure sessions have been established, the intermediary provides intermediation services between the server and the client in an intermediated secure session. The intermediation service may be, for example, detecting whether a message sent by the client includes a credit card number. To prevent the credit card number from being sent over a network, credit card number may be replaced with a one-time use payment number.

17 Claims, 13 Drawing Sheets

U.S. PATENT DOCUMENTS

| | | |
|---|---|---|
| 6,199,077 B1 | 3/2001 | Inala et al. |
| 6,199,079 B1 | 3/2001 | Gupta et al. |
| 6,202,087 B1 | 3/2001 | Gadish |
| 6,233,608 B1 | 5/2001 | Laursen et al. |
| 6,247,048 B1 | 6/2001 | Greer et al. |
| 6,253,193 B1 | 6/2001 | Ginter et al. |
| 6,266,681 B1 | 7/2001 | Guthrie |
| 6,269,460 B1 | 7/2001 | Snover |
| 6,311,215 B1 | 10/2001 | Bakshi et al. |
| 6,317,718 B1 | 11/2001 | Fano |
| 6,321,256 B1 | 11/2001 | Himmel et al. |
| 6,407,680 B1 | 6/2002 | Lai et al. |
| 6,421,733 B1 | 7/2002 | Tso et al. |
| 6,434,614 B1 | 8/2002 | Blumenau |
| 6,457,030 B1 | 9/2002 | Adams et al. |
| 6,510,458 B1 | 1/2003 | Berstis et al. |
| 6,510,464 B1 | 1/2003 | Grantges et al. |
| 6,519,631 B1 | 2/2003 | Rosenschein et al. |
| 6,535,896 B2 | 3/2003 | Britton et al. |
| 6,560,607 B1 | 5/2003 | Lassesen |
| 6,582,474 B2 | 6/2003 | LaMarca et al. |
| 6,590,588 B2 | 7/2003 | Lincke et al. |
| 6,594,697 B1 | 7/2003 | Praitis et al. |
| 6,643,641 B1 | 11/2003 | Snyder |
| 6,684,249 B1 | 1/2004 | Frerichs et al. |
| 6,687,732 B1 | 2/2004 | Bector et al. |
| 6,694,484 B1 | 2/2004 | Mueller |
| 6,704,773 B1 | 3/2004 | Cohn et al. |
| 6,721,780 B1 | 4/2004 | Kasriel et al. |
| 6,826,597 B1 | 11/2004 | Lonnroth et al. |
| 6,832,239 B1 | 12/2004 | Kraft et al. |
| 6,874,018 B2 | 3/2005 | Wu |
| 6,880,123 B1 | 4/2005 | Landsman et al. |
| 6,892,181 B1 | 5/2005 | Megiddo et al. |
| 6,910,068 B2 | 6/2005 | Zintel et al. |
| 6,912,571 B1 | 6/2005 | Serena |
| 6,918,090 B2 | 7/2005 | Hesmer et al. |
| 6,925,485 B1 | 8/2005 | Wang et al. |
| 6,987,987 B1 | 1/2006 | Vacanti et al. |
| 7,003,501 B2 | 2/2006 | Ostroff |
| 7,080,158 B1 | 7/2006 | Squire |
| 7,107,309 B1 | 9/2006 | Geddes et al. |
| 7,210,094 B2 | 4/2007 | Dovin et al. |
| 2001/0035885 A1 | 11/2001 | Iron et al. |
| 2002/0007393 A1 | 1/2002 | Hamel |
| 2002/0047859 A1 | 4/2002 | Szlam et al. |
| 2002/0059396 A1 | 5/2002 | Holzer et al. |
| 2002/0099738 A1 | 7/2002 | Grant |
| 2002/0120564 A1 | 8/2002 | Strietzel |
| 2002/0129064 A1 | 9/2002 | Guthrie |
| 2002/0133467 A1 | 9/2002 | Hobson et al. |
| 2002/0165925 A1 | 11/2002 | Hamilton, II et al. |
| 2003/0018668 A1 | 1/2003 | Britton et al. |
| 2003/0023634 A1 | 1/2003 | Justice et al. |
| 2003/0032413 A1 | 2/2003 | Aksu et al. |
| 2003/0055878 A1 | 3/2003 | Fletcher et al. |
| 2003/0058271 A1 | 3/2003 | Van Der Meulen |
| 2003/0110296 A1 | 6/2003 | Kirsch et al. |
| 2003/0177248 A1 | 9/2003 | Brown et al. |
| 2003/0187806 A1 | 10/2003 | Banerjee et al. |
| 2004/0059783 A1 | 3/2004 | Kazui et al. |
| 2004/0098352 A1 | 5/2004 | Matsuyama |
| 2005/0055422 A1 | 3/2005 | Campbell et al. |
| 2005/0066012 A1 | 3/2005 | Campbell et al. |
| 2005/0086298 A1 | 4/2005 | Campbell et al. |
| 2005/0138432 A1 | 6/2005 | Ransom et al. |
| 2005/0144557 A1 | 6/2005 | Li et al. |
| 2005/0154643 A1 | 7/2005 | Doan et al. |
| 2006/0064600 A1 | 3/2006 | Polichetti et al. |

FOREIGN PATENT DOCUMENTS

| | | |
|---|---|---|
| WO | WO 03065678 | 8/2003 |

OTHER PUBLICATIONS

Gerck, E., Ph.D., "Overview of Certification Systems: X.509, PKIX, CA, PGP & SKIP" Jul. 18, 2000.

Gerck, E., "Overview of Certification Systems: X.509, CA, PGP and SKIP" http://mcg.org.br/cert.htm Apr. 17, 1997.

http://www.hsc.fr/resources/presentations/pki/img9.htm, 1999.

Trusted Computing Platform Alliance (TCPA), "Building a Foundation of Trust in the PC" Jan. 2000.

Carroll, Amy; Juarez, Mario; Polk, Julia and Leininger, Tony, "Microsoft "Palladium": A Business Overview", Jan. 25, 2003 http://www.microsoft.com/presspass/features/2002/jul02/0724palladiumwp.asp.

Anderson, Ross., "TCPA / Palladium Frequently Asked Questions", Version 1.0. http://www.cl.cam.ac.uk/~rja14/tcpa-faq.html, Jan. 16, 2003.

http://www.thoughtcrime.org/ie-ssl-chain.txt, Aug. 5, 2002.

Network Appliance, "Internet Content Adaptation Protocol (ICAP)," pp. 1-13, Jul. 30, 2001.

IBM, "Intermediaries: An Approach to manipulating Information Streams", http://www.research.ibm.com/journal/sj/384/barrett.html, IBM Systems Journal, vol. 38, No. 4, 1999.

First USENIX Workshop on Electronic Commerce, Jul. 1995, Payment Switches for Open Networks, http://www.usenix.org/publications/library/proceedings/ec95/gifford.html, printed from the World Wide Web on Apr. 15, 2002.

USENIX, "Payment Switches for Open Networks," Proceedings of the First USENIX Workshop on Electronic Commerce, New York, New York, Jul. 1995, http://www.usenix.org/publications/library/proceedings/ec95/full_papers/gifford.txt, printed from the World Wide Web on Apr. 15, 2002.

Redknee, "Mobile Multimedia Gateway," http://www.redkneww.com/products/rk_pro_net_mobilemultimediagateway.php, printed from the World Wide Web on Apr. 15, 2002.

"Open Pluggable Edge Services (OPES)," http://www.ietf-opes.org/oldindex.html, printed from the World Wide Web on Apr. 15, 2002.

IBM, "Web Intermediaries (WBI)," http://www.almaden.ibm.com/cs/wbi/index.html, printed from the World Wide Web on Apr. 30, 2002.

IBM, "Plugins," http://www.almaden.ibm.com/cs/wbi/Plugins.html, printed from the World Wide Web on Apr. 30, 2002.

IBM, "WebPlaces: Adding People to the Web," http://www.almaden.ibm.com/cs/wbi/papers/www8/wwwplaces-abstract.html, printed from the World Wide Web on Apr. 30, 2002.

IBM, "WebSphere Edge Server—Product Overview—IBM Software," http://www-3.ibm.com/software/webservers/edgeserver/, printed from the World Wide Web on Sep. 3, 2002.

Bridgewater Systems, "Content Access Controller," http://www.bridgewatersystems.com/products/content_controller/?BSCID=d8f8772, printed from the World Wide Web on Sep. 3, 2002.

A. Barbir et al., "An Architecture for Open Pluggable Edge Services (OPES)," Network Working Group, Internet-Draft, Aug. 2, 2002.

A. Barbir et al., "OPES Use Cases and Deployment Scenarios," Network Working Group, Internet-Draft, Aug. 5, 2002.

A. Beck et al., "Requirements for OPES Callout Protocols," Internet-Draft, Aug. 2, 2002.

A. Beck et al., "Example Services for Network Edge Proxies," Internet Draft, Nov. 21, 2000.

IBM, Location-based services, http://www-106.ibm.com/developerworks/ibm/library/I-lbs/, printed from the World Wide Web on May 23, 2003.

Identifying Web Users in a Proxy Server, U.S. Appl. No. 09/466,104.

Extracting Contents of a Document During Delivery, U.S. Appl. No. 09/512,974.

Secure Network Proxying, U.S. Appl. No. 09/512,975.

Expediting the Retrieval of External Components Referenced in a Document, U.S. Appl. No. 09/512,976.

Commerical Activity Performed in Conjunction with Document Retrieval, U.S. Appl. No. 09/512,977.

Modifying Contents of a Document During Delivery, U.S. Appl. No. 09/513,217.

Fielding et al. "Request for Comments (RFC) 2616: Hypertext Transfer Protocol—HTTP/1.1", published by Network Working Group, Jun. 1999.

Pollock, "A Custom 404 page", www.pagesource.com/zine/custom404.htm, Apr. 18, 1999.

4GuysFrom Rolla.com, "Creating a Custom 404 Error page", publicly posted Apr. 21, 1999.

The Apache Foundation, "Custom Error Responses", Apache HTTP Server Version 1.3, documentation released Dec. 5, 2001.

Thomason, Larisa, "Load Time Tip: Reuse, Optimize, and preload Images" http://www.netmechanic.com/news/vol_13/loadtime_no6.htm, vol. 3, No. 6, Jun. 2000.

Wang et al., "Department of Computer Science, University College London, London WC1E 6BT, United Kingdom".

Tong et al., Alleviating the Latency and Bandwidth Problems in WWW Browsing, http://www.usenix.org/publications/library/proceedings/usits97/full_papers/tong/tong_html, Oct. 26, 1997.

Padmanabhan et al., "Using Predictive Prefetching to Improve World Wide Web Latency".

Jacobson et al., "Potential and Limits of Web Prefetching Between Low-Bandwidth Clients and Proxies".

Jiang et al., "Web Prefetching in a Mobile Environment" IEEE Personal Communications, pp. 25-34, Oct. 1998.

Davison, "Predicting Web Actions from HTML Content" Jun. 15, 2002.

Duchamp, "Prefetching Hyperlinks" Usenix, Boulder, Colorado, Oct. 11-14, 1999.

Bestavros, Azer, "Speculative Data Dissemination and Service to Reduce Server Load, Network Traffic and Service Time in Distributed Information Systems" Mar. 1996.

Wcol, " WWW Collector Home page", http://shika.aist-nara.ac.jp/products/wcol/wcolE.html, printed from the World Wide Web on Jul. 1, 2003.

Chinen, et al., "An Interactive Prefetching Proxy Server for Improvement of WWW Latency", http://www.isoc.org/inet97/proceedings/A1/A1_3htm, Jul. 3, 2003.

The List Preload Images, http://www.lists.evolt.org/archive/Week-of-mon-20020204/067827.html.

Burns, "So, You Want to Pre-Load, Hugh?", http://www.htmlgoodies.com/tutors/preload.html, printed from the World Wide Web on Nov. 14, 2002.

Google Groups, "Lewis, Stephen, Newsgroup Message, dated Jul. 24, 2000", http://groups-beta.google.com/group/microsoft.public.webdesign.html.

ZDNet: Tech Update: Enterprise Application/Single Sign-on Battle Looms, http://techupdate.zdnet.com/techupdate/stories/main/0,14179,2824248,00.html, printed from the World Wide Web on Feb. 19, 2002.

Introduction to Single Sign-On, http:www.opengroup.org/security/sso/sso_intro.htm, printed from the World Wide Web on Feb. 19, 2002.

Novell: Novell SecureLogin, http://www.novel.com/source/printer_friendly/ qI20017_en.html, printed from the World Wide Web on Feb. 19, 2002.

Lemay, Teach Yourself Web Publishing with HTML 3.0 in a Week, published by Sams.net, p. 65, 1996.

American Express Company 2001, http://www.26.americanexpress.com/privatepayments/fag.jsp, printed from the World Wide Web on Oct. 17, 2002.

U.S. Appl. No. 10/128,828, filed Apr. 24, 2002.
U.S. Appl. No. 10/189,941, filed Jul. 3, 2002.
U.S. Appl. No. 10/189,937, filed Jul. 3, 2002.
U.S. Appl. No. 10/189,892, filed Jul. 3, 2002.
U.S. Appl. No. 10/190,362, filed Jul. 3, 2002.
U.S. Appl. No. 10/189,720, filed Jul. 3, 2002.
U.S. Appl. No. 10/824,113, filed Apr. 14, 2004.
Office Action from U.S. Appl. No. 10/824,113, dated Mar. 26, 2008.
Office Action from U.S. Appl. No. 10/824,113, dated Oct. 29, 2008.
Office Action from U.S. Appl. No. 10/824,113, dated Jan. 14, 2009.
Office Action from U.S. Appl. No. 10/824,113, dated Jun. 8, 2010.

* cited by examiner

SECURE INTERMEDIATION SYSTEM AND METHOD

BACKGROUND

This invention relates to network communications. In particular, this invention relates to a system and method for providing secure intermediation services in communications over a network.

With the growth of electronic commerce, valuable private data, such as credit card numbers, are increasingly sent over the public Internet. Users of the Internet, however, are reluctant to send such information if they do not trust that their communications will be secure. As the use of credit cards on the public Internet increases, so too does the fear that a credit card number will be intercepted and misused by a malevolent eavesdropper or untrustworthy payee.

These security concerns largely arise from two properties of the Internet. First, the Internet is not inherently secure; communications sent over the Internet can be read and understood by an eavesdropper unless they are encrypted. Second, nodes on the Internet are not inherently trustworthy; it is difficult to authenticate the identity of a node on the Internet. As an example of the problems of security and trust, a customer is unlikely to send a credit card number to a retailer over the Internet unless he is confident that the number will not be read by a third party (an issue of security). Likewise, the customer is not likely to send his card number over the Internet if he is not sure that the Internet address to which he is sending the number is actually the address of the retailer (an issue of trust).

The problems of security and trust, then, threaten to significantly impair the flow of electronic commerce. These problems have been addressed by the development of protocols that enable secure sessions between parties. By entering into a secure session, parties can communicate securely over an insecure medium, such as the Internet.

Secure sessions make use of encryption keys that are possessed by the parties to the session and that are used to encrypt and decrypt data exchanged between the parties. Encryption keys may be symmetric or asymmetric. Information encrypted with a symmetric key can be decrypted with the same key. Information encrypted with an asymmetric key can be decrypted only with a complementary asymmetric key. A complementary pair of asymmetric keys consists of a "public" key and a "private" key. Thus, data encrypted with a public key can be decrypted only with the corresponding private key, and data encrypted with a private key can be decrypted only with the corresponding public key.

Both symmetric and asymmetric key systems have practical limitations. In communications using symmetric keys, the symmetric key must be known to both parties in the secure session. As a result, the parties must solve the problem of sharing the key before the session starts while preventing a third party from intercepting the key. The use of asymmetric keys avoids this difficulty: only the public key needs to be shared, and information encrypted with the public key can be decrypted only with the private key. Thus, a would-be eavesdropper who learns a public key cannot decrypt communications without a private key. In secure communications, each party encrypts information with the other party's public key, and the problem of exchanging keys is avoided. The practicality of asymmetric keys is limited, however, by the large processing resources necessary to encrypt and decrypt data using asymmetric keys.

To overcome some of these practical limitations, protocols have been developed that combine the use of both symmetric and asymmetric keys. To start a secure session, parties employing such a protocol use asymmetric keys to exchange a session key. The session key, which may be a symmetric key, is used only for a single session.

In these protocols, asymmetric keys are used to provide trust as well as security by offering a method of verifying the identity of a party. A party that needs to prove its identity sends a "certificate" to the other party. One common format for certificates is the X.509 format. An X.509 certificate includes, among other data, the name of the certified party, the public key of that party, and an expiration date. Thus, if the certificate is valid, one can be confident that data encrypted with the public key in the certificate can be read only by the party named in the certificate. To prevent forgery of an X.509 certificate (e.g. changing the party named in the certificate), the certificate is "signed" by a certification authority. A party may "sign" data, such as a certificate, by encrypting all or part of the data, or a hash value of the data, with that party's private key. (A hash value is a number generated from a string of text in such a way that it is very unlikely that different text would produce the same number.)

To check the validity of an X.509 certificate, the party receiving the certificate tests whether the encrypted portion of the certificate can be decrypted with the public key of the certification authority and whether the certificate has passed its expiration date.

The use of certificates helps to prevent a so-called "man-in-the-middle" attack, in which an eavesdropper listens in on an exchange between parties. To execute a man-in-the-middle attack between a first party and a second party, the eavesdropper poses as the second party to the first party, and as the first party to the second party.

To be confident that an X.509 certificate properly identifies the party presenting the certificate, one must be confident that the private key of the certification authority has not been compromised and that the certification authority only issues certificates that properly identify the party associated with the public key. Thus, the trust that a party has in a secure session can be no greater than the trust that party has in the certification authority itself. See, for example, Ed Gerck, "Overview of Certification Systems: X.509, PKIX, CA, PGP & SKIP" (Jul. 18, 2000).

One protocol commonly used to provide trust and security on the Internet is the Secure Socket Layer (SSL) protocol, developed by Netscape. In the SSL protocol, as illustrated in FIG. 1, one network node, such as a client, requests an SSL session with another network node, such as a server, at step 10. The server receives the request 12 and responds to the request by sending 14 a certificate, such as an X.509 certificate, to the client. The client receives 16 the certificate and checks 18 the certificate for validity. If the certificate is not valid, the client and server do not enter into an SSL session. If the certificate is valid, the client and server exchange 22 information that they use to generate session keys for the SSL session. The exchange of messages leading up to the establishment of the secure session is known as the "handshake" protocol. If the handshake is completed successfully, the client and server use the session keys to encrypt and decrypt data that they send 24 back and forth between the client and server in the SSL session.

One common use for SSL secure sessions is the transfer of credit card numbers in on-line payment transactions. While SSL provides a certain level of trust and security, it does not resolve these issues completely. For example, a customer may send a credit card number in a secure, encrypted form to a retailer who presents a valid certificate. However, if that retailer is dishonest, he may nevertheless overcharge the customer's account. Furthermore, SSL does not enable a customer to ensure that even an honest retailer will erase the card number or store the number securely after the transaction, leaving open the possibility that a malicious hacker will misuse the number after learning it from the retailer.

To provide additional security in the use of credit cards numbers, some credit card issuers have begun issuing limited-use account numbers that cardholders can use in place of their permanent card numbers, particularly for on-line payment transactions. Depending on the services offered by the issuer, a limited-use account number may be limited to use during a particular time period, for a limited amount of money, or with a particular vendor.

To request a limited-use account number, a cardholder can go to the Web site of an account services provider associated with the issuer of the card and request a limited-use account number. Then, when the user wishes to make an on-line payment, the user sends the limited-use account number in place of his or her permanent card number.

If a cardholder makes a payment using the limited-use account number in accordance with the limited-used provisions (e.g., to the specified vendor, in the specified time frame), the payment will be successfully charged to the cardholder's ordinary account. Attempts to charge the account outside the limited use provisions will not be successful. Because the cardholder has not sent his or her permanent card number over the Internet, fraudulent charges are less likely to be made against the cardholder's account. The use of limited-use account numbers has not been widespread, however, in part because a user must actively request a card number for each transaction, belying the Internet's promise of streamlined commerce.

SUMMARY

In a secure intermediary system, an intermediary is positioned along a communications path between a client node and a server node. The client node sends a request to enter into a secure session, such as an SSL session, addressed to the server node. The intermediary receives the session request addressed to the server node and, in response to the session request, establishes a first secure session between the client node and the intermediary and a second secure session between the intermediary and the server. After the first and second secure sessions have been established, the intermediary provides intermediation services between the server and the client in an intermediated secure session. In providing the intermediated secure session, data sent by the client to the server is encrypted by the client, sent along the communication path in the first secure session, and received by the intermediary. The intermediary decrypts the data, provides intermediation services, and re-encrypts the data for transmission in the second secure session. The intermediary then transmits the encrypted, intermediated data to the server in the second secure session. The server may then decrypt the data.

In one alternative embodiment, in which the communications path between the client and the intermediary is a secure communications path, such as CDMA communications, the intermediary enters into a secure session only with the server, avoiding the inefficiency of entering into a secure session over a communications path that is already secure. In another alternative embodiment, in which the communications path between the intermediary and the server is a secure communications path, such as a private data connection, the intermediary enters into a secure session only with the client.

In an exemplary embodiment, the intermediation service offered by the secure intermediation system detects whether a message sent by the client is a payment message that includes an account number, such as a credit card number. To prevent the client's account number from being sent over a public network, the intermediary replaces the account number with a limited-use payment number. The intermediary may obtain the limited-use payment number by issuing a request to a payment number server, such as a Web site associated with a credit card issuer.

DETAILED DESCRIPTION

I. Overview of a Secure Intermediary

Figure 1:
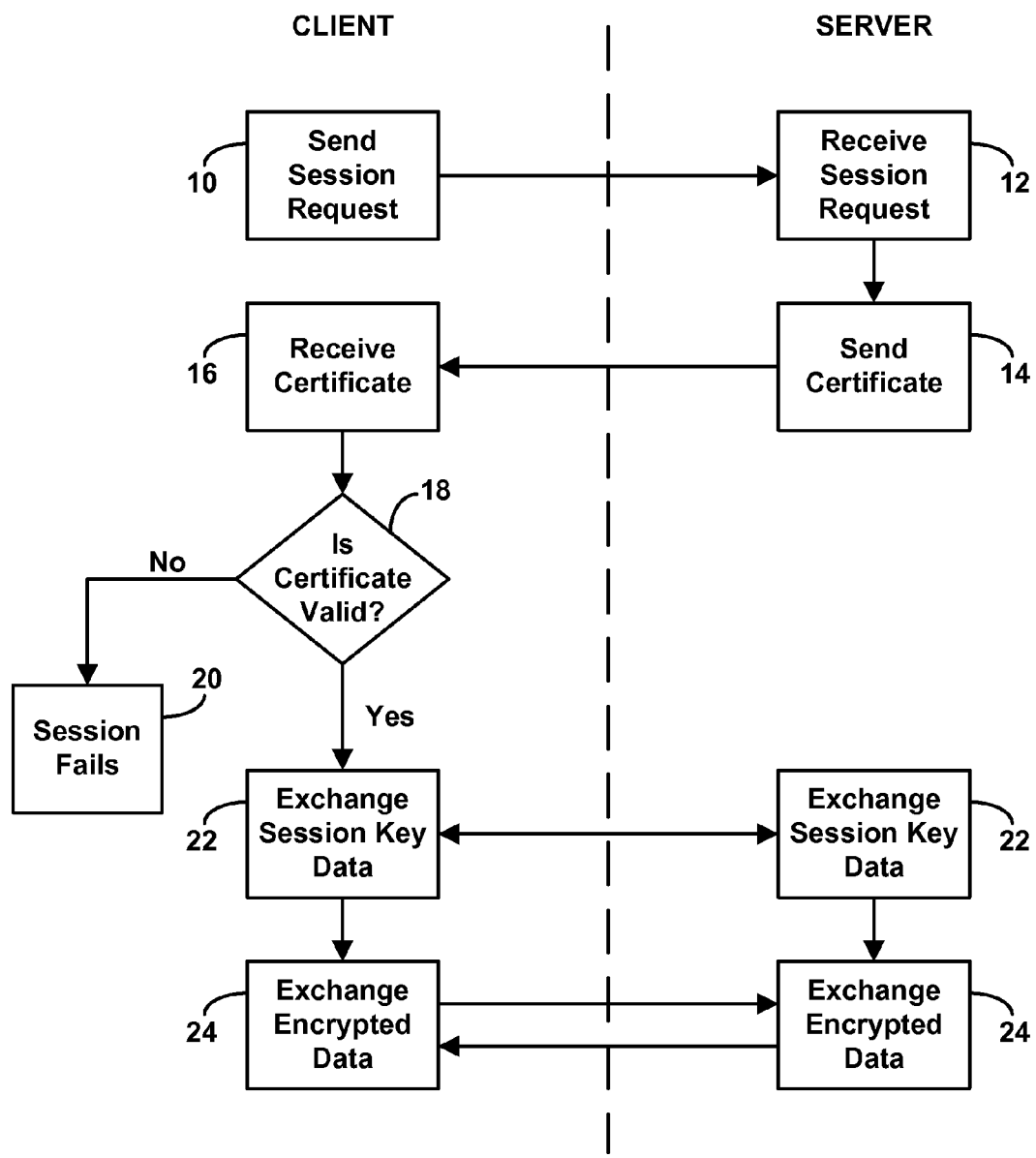
FIG. 1 is a logical flow diagram of a prior-art SSL handshake.
Figure 2:
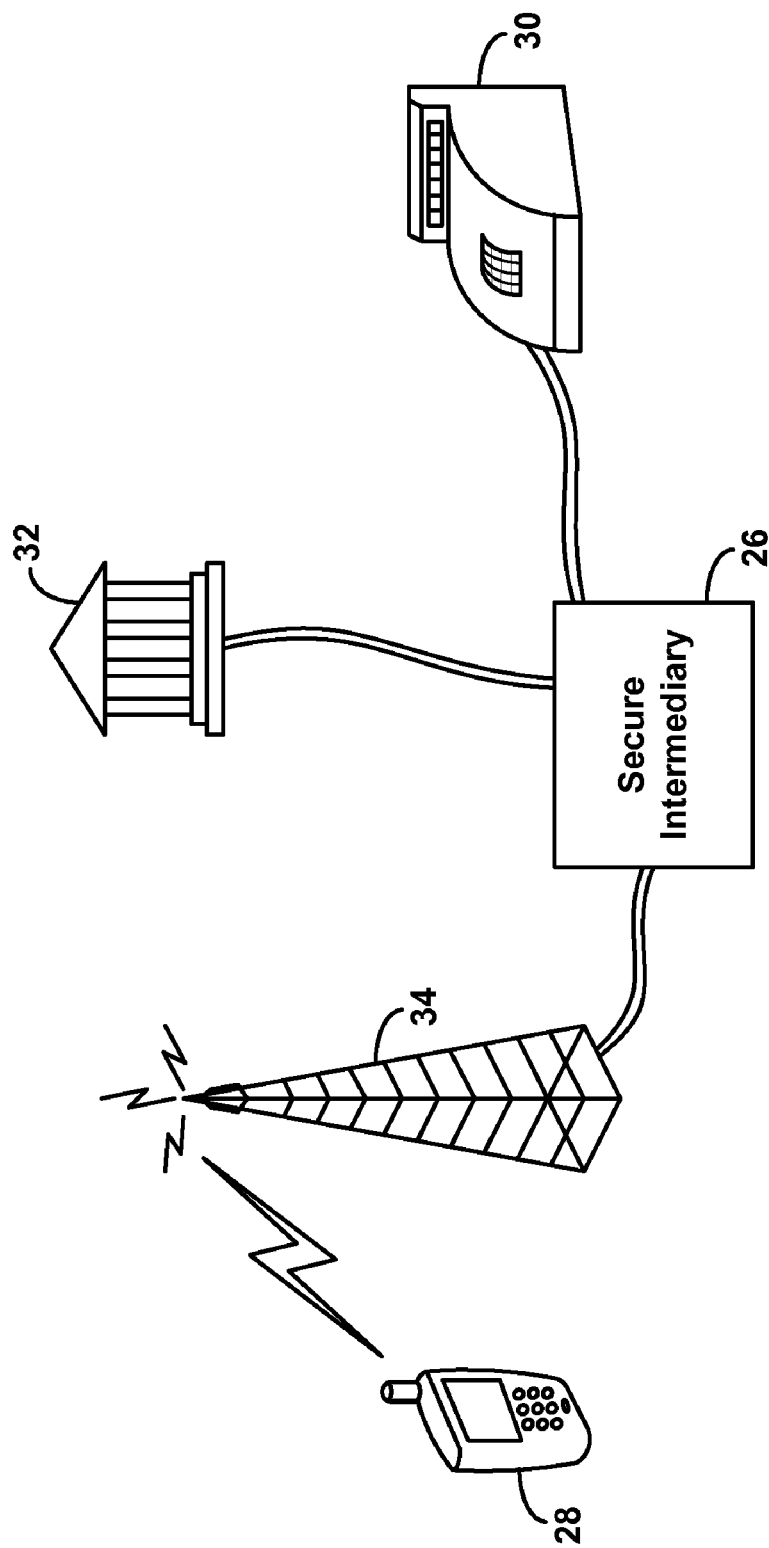
FIG. 2 is a schematic illustration of a secure intermediation system.

An intermediary 26 provides secure intermediation services between a client node 28 and a server node 30 by monitoring data exchanged between the client and server and, where appropriate, manipulating the data to provide enhanced security or other services. (FIG. 2.) As one example, the intermediary may replace a credit card number sent by the client with a limited-use account number to reduce the possibility of unauthorized charges. The services offered by the intermediary are described in greater detail below.

To provide its services, the intermediary 26 is positioned along a communications path between the client 28 and the server 30. The client node 28 may be implemented by a Web browser on a device such as a Web-enabled mobile phone or a personal computer with an Internet connection. The server node 30 may be the Web site of an on-line retailer or other on-line service provider. The secure intermediary may be in communication with one or more external intermediation service providers 32. The service provider 32 may be, for example, a credit card issuer who provides limited-use account numbers.

In one embodiment, the intermediary 26 is operated by a mobile telecommunications service provider. In this embodiment, the intermediary 26 serves several client nodes 28. When one of the clients is in communication with a server node 30 on the Internet, data sent from the client to the server travel first on a private wireless network between the client and the intermediary through the use, for example, of a network of base transceiver stations 34. Those data then travel over the Internet between the intermediary and the server. Conversely, data sent from the server to the client travels over the Internet between the server and the intermediary and over the private network between the intermediary and the client. The communications between the intermediary and the server need not take place entirely over the Internet; for example, communications may travel from the intermediary to a separate proxy server or packet data serving node (PDSN) (not illustrated) before being sent over the Internet.

Figure 3:
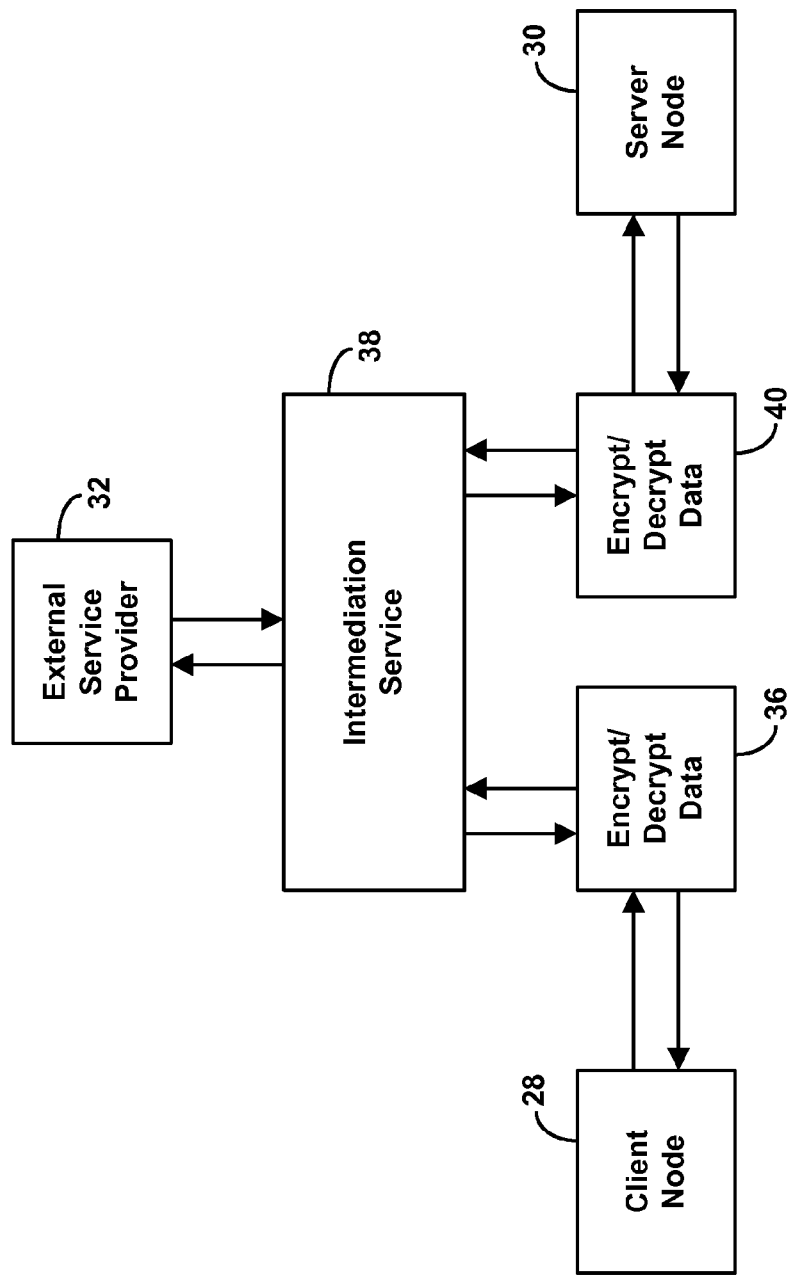
FIG. 3 is a schematic illustration of the functional architecture of a secure intermediation system.

The intermediary 26 is capable of providing intermediation services even when the client and server are exchanging encrypted communications in a secure session. In this way, the client is provided with the benefit of the intermediation services and the security of encrypted communications. To intermediate in a secure session (FIG. 3), communications sent by the client node 28 are received by the intermediary and are decrypted 36 with the permission of the client node.

The intermediary may receive permission of the client node in or more one of several ways, as described in section II. For example, the intermediary may receive session key data from the client node (as in sections II.A and II.B), or it may receive a request for a secure session (as in sections II.C and II.D). The intermediary may request permission of the client node by, for example, sending the intermediary's certificate to the client node (as in section II.A).

The intermediary provides an intermediation service 38 by acting on the decrypted data. The intermediary may enlist the aid of the external service provider 32 in providing the services. Once the intermediary provides an intermediation service, it encrypts 40 the data (which may have been modified by the intermediary) and sends the encrypted data to the server 30.

Various examples of the manner in which an intermediary can participate in a secure session with the client and server are provided in Section II, below. Examples of the intermediation services offered by the intermediary are provided in Sections III and IV, below.

II. Establishing Intermediary Communications

An intermediary may employ one of several different approaches to intermediate in secure communications between a client and a server. Four such approaches—and variants thereon—are described in subsections A-D, below. In the first approach, two secure sessions are established: one between the client and intermediary and one between the intermediary and server. In the second approach, a single secure session is established between the client and server, but either the client or the server sends an encryption key to the intermediary to enable the intermediation. In the third approach, which may be used when the intermediary has a trusted and secure connection with the server, a single secure session is established between the client and the intermediary. In the fourth approach, which may be used when the intermediary has a trusted and secure connection with the client, a single secure session is established between the intermediary and the server. It should be noted, however, that the intermediary may still provide intermediation services, such as those described in Section III, even when no secure session has been established.

A. Two Secure Sessions

1. The Handshake Protocol

Figure 4:
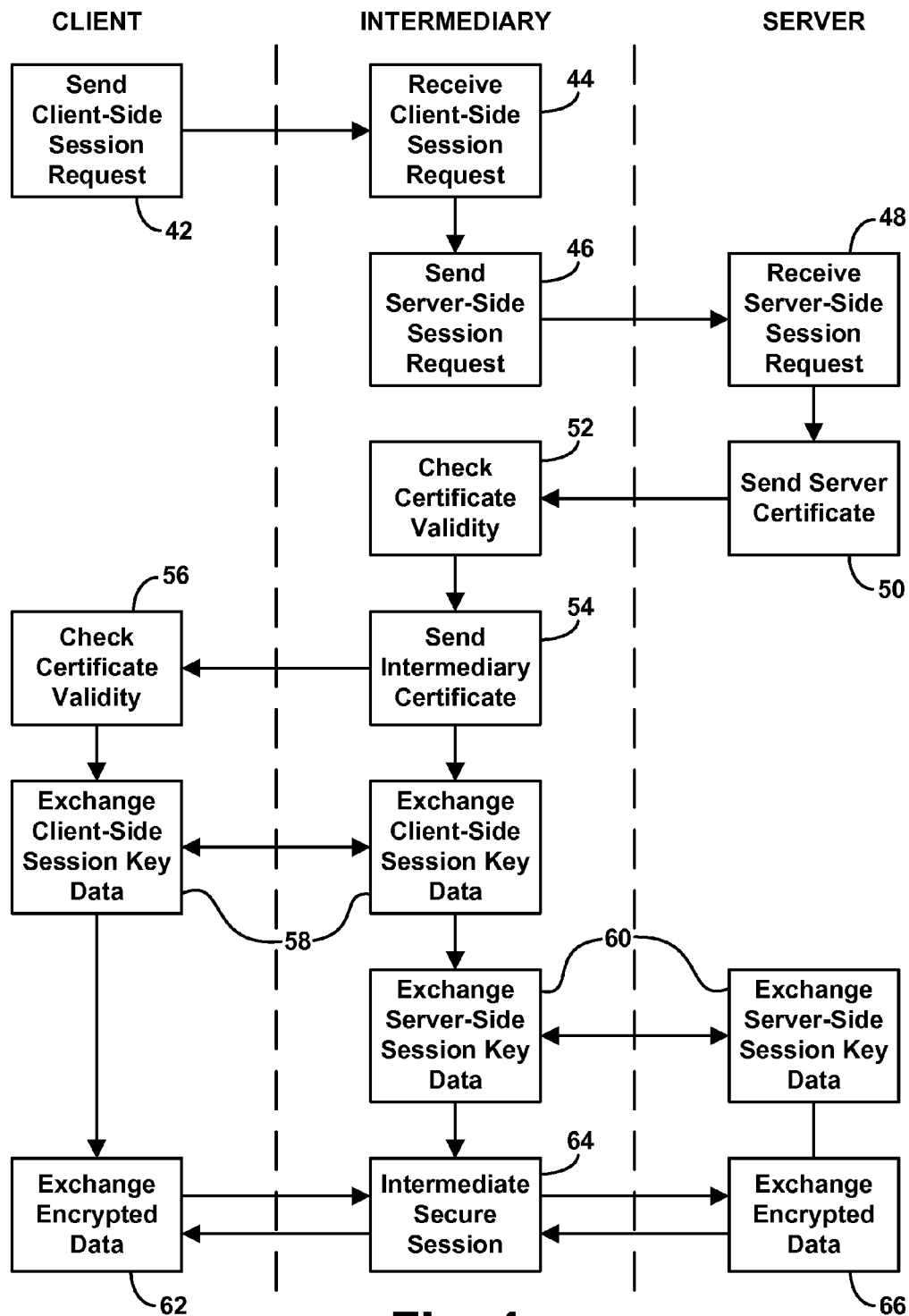
FIG. 4 is a logical flow diagram illustrating the establishment of a secure intermediation session in a dual-session embodiment.

In one embodiment, illustrated in FIG. 4, the intermediary establishes two secure sessions: one with the client and one with the server. In step 42, the client sends a request for a secure session addressed to the server. The request may be a request for an SSL session. The intermediary, which is positioned along a communications path between the client and server, receives the client-side session request at step 44. Instead of forwarding the client-side session request to the server, the intermediary establishes secure sessions with both the client and the server.

Before secure sessions are established, the intermediary authenticates the identity of the server and authenticates itself to the client. To authenticate the server, the intermediary sends a server-side session request to the server at step 46. The server-side session request, which may be a request for an SSL session, is received by the server at step 48. In response to the server-side session request, the server sends its certificate, which may be an X.509 certificate, to the intermediary at step 50. The server checks the validity of the server certificate at step 52. If the server certificate is invalid, the intermediary does not enter into a secure session with the server. To authenticate itself to the client, the intermediary sends its own certificate to the client at step 54.

The client checks the validity of the intermediary certificate at step 56. In one embodiment, the client is programmed to accept either a valid intermediary certificate or a valid server certificate, so that if there is no intermediation, the client accepts the server certificate, whereas if there is intermediation, the client accepts the intermediary certificate. Validation of certificates by the client is described more fully with respect to FIG. 5, below.

Before each secure session is established, the intermediary shares session key data with the client and server. In step 58, the client and intermediary exchange data that is used to generate session keys, with which data exchanged between the client and server is encrypted. In an SSL session, the exchange takes place when the client generates a "premaster secret," encrypts the premaster secret with the intermediary's public key (which, in an SSL session, is sent in the intermediary certificate), and sends the premaster secret to the intermediary. The client and the intermediary in an SSL session separately generate the same "master secret" from the premaster secret. In an SSL session, the client and intermediary create a series of session keys from the master secret and regularly change the session key used to encrypt the exchanged data. In step 60, the intermediary also shares session key data—such as a premaster secret—with the server.

After session key data has been exchanged between the client and intermediary to establish a first secure session, and between the server and intermediary to establish a second secure session, the intermediary links the first and second secure sessions to enable communications between the client and the server. To link the sessions, the intermediary forwards data received from the client in the first secure session to the server over the second secure session. Likewise, the intermediary forwards data received from the server in the second secure session to the client over the first secure session. Thus, encrypted data is sent from the client to the intermediary (step 62), where the intermediary may perform intermediation services on the data (step 64) and re-encrypt the data (which may or may not have been modified during the intermediation) for transmission to the server. Conversely, the server can send encrypted data (step 66) to the intermediary, and the intermediary decrypts the data, performs any intermediation services, re-encrypts the data, and sends the data to the client.

The steps involved in initiating the two secure sessions may occur in a different order from that described above and illustrated in FIG. 4. For example, the intermediary can send its certificate to the client before the intermediary has validated the server certificate. The exchange of session key data could take place before the validation of the intermediary and server certificates; however, it is preferred that no private data be exchanged in a secure session before the intended recipient of that data has been authenticated. If one secure session is established before another, the intermediary can cache private data sent in that secure session until the other session is established.

Additional steps not illustrated in FIG. 4 may also be involved in the creation of the secure sessions. For example, as in the SSL protocol messages may be exchanged between the client and the intermediary and between the intermediary and the server in which the parties agree on which key-exchange and encryption algorithms will be used in the secure sessions.

2. Operation of the Client

Figure 5:
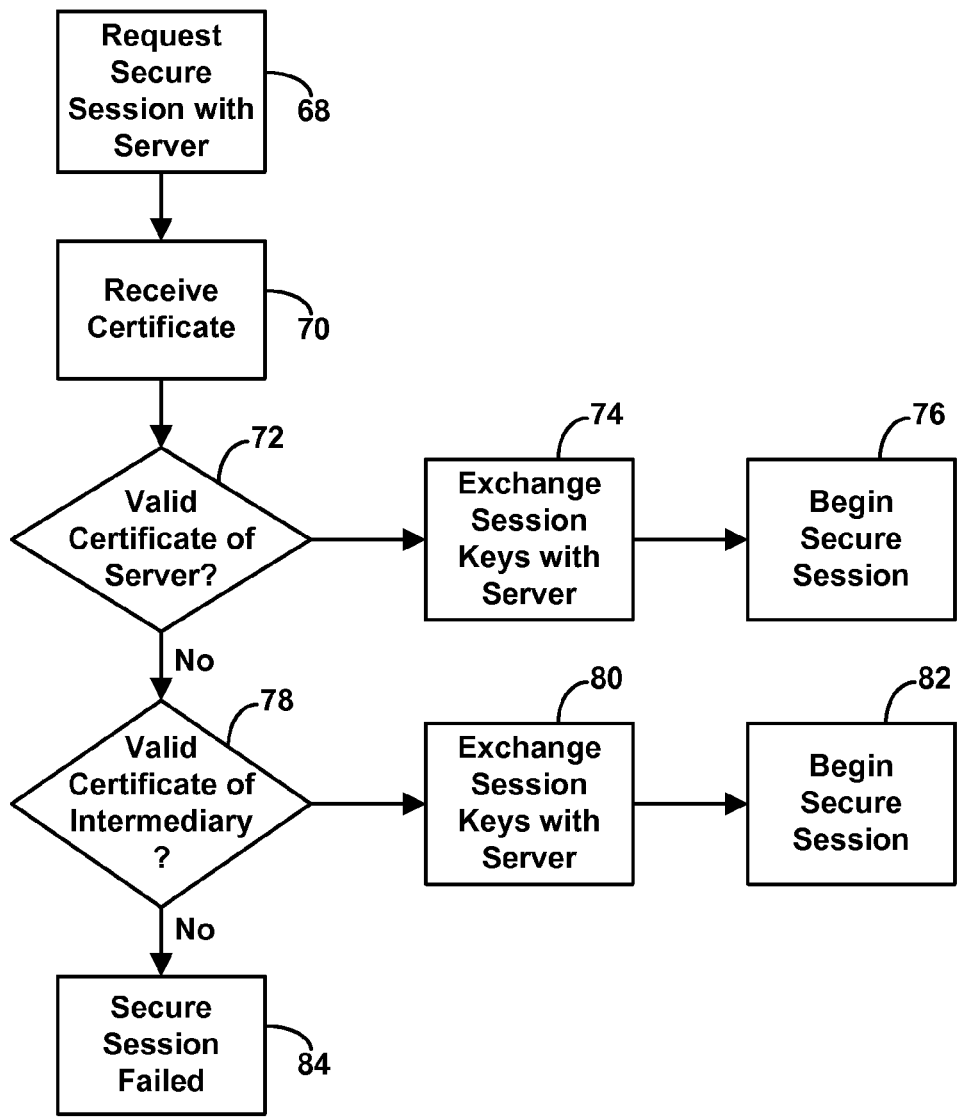
FIG. 5 is a logical flow diagram illustrating functions performed by a client node in the establishment of a secure intermediation session.

The operation of a client in an embodiment using dual secure sessions is illustrated the flow diagram of FIG. 5. The client sends a request for a secure session at step 68. The request is addressed to a server with which the client wishes to communicate, such as a Web server of an on-line retailer. After sending its request for a secure session, the client receives a certificate at step 70. The client in this embodiment can accept a certificate from either the server or the intermediary. In this way, the client can enter into a secure session with either the intermediary or the server.

If the client receives the certificate of the server, it can validate the certificate as it would in an ordinary SSL protocol. The client determines at step 72 whether the certificate is a valid certificate of the server. If the certificate of the server is valid, the client and server exchange session key data at step 74 and begin exchanging encrypted data in a secure session at step 76.

If, on the other hand, the client receives the certificate of the intermediary, then the entity with which the session was requested (the server) is not the same as the entity from whom the certificate was received. The client should be capable of distinguishing between a certificate sent by a trusted intermediary and a certificate sent by an eavesdropper executing a man-in-the-middle attack or by another party without proper certification. The client checks the validity of the intermediary certificate at step 78. In one embodiment, the client accepts the intermediary certificate only if the certificate includes an identifier of the intermediary and only if the certificate is signed by a trusted certification authority. In another embodiment, the client accepts the intermediary certificate only if it is signed by the intermediary itself. In the latter embodiment, the client has the public key of the intermediary, which it uses to determine whether the intermediary certificate was properly signed by the intermediary.

If the intermediary accepts the certificate of the intermediary, then the client exchanges session key data with the intermediary at step 80 and exchanges encrypted data with the intermediary at step 82.

3. Operation of the Intermediary

Figure 6:
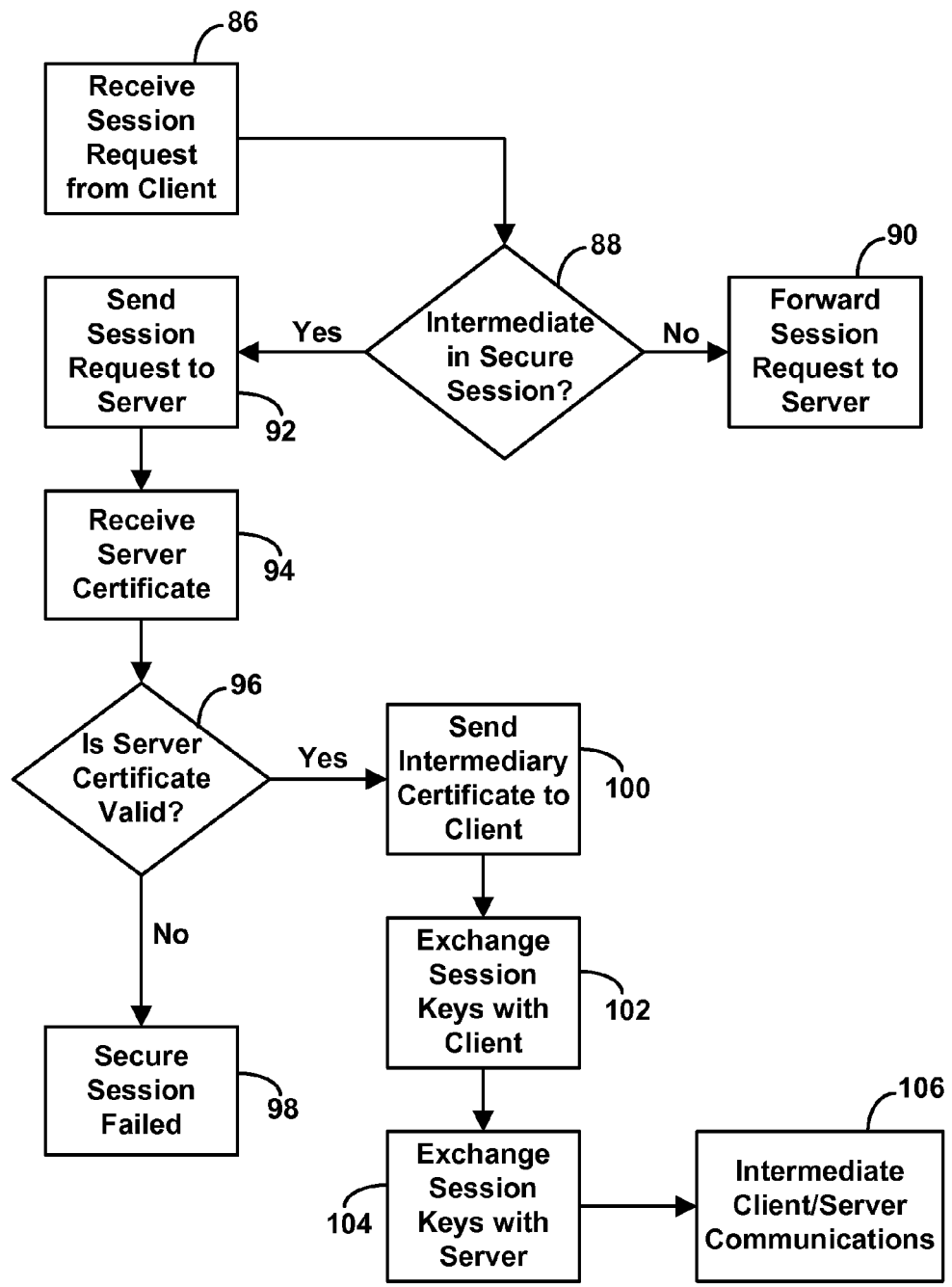
FIG. 6 is a logical flow diagram illustrating functions performed by an intermediary in the establishment of a secure intermediation session.

The operation of an intermediary in an embodiment using dual secure sessions is illustrated the flow diagram of FIG. 6. The intermediary detects a request for a secure session sent by the client to a server at step 86. At step 88, the intermediary decides whether to intermediate in the secure session. The decision may be based on, for example, the identity of the client and the identity of the server. In one embodiment, each client may specify to the intermediary those servers for which secure sessions should be intermediated. In an alternative embodiment, each client may be given the option to "opt out" of intermediation for selected servers, in which case the intermediary will not intermediate in secure sessions between the client and the selected servers. Alternatively, those clients and servers for which secure sessions will be intermediated may be determined by the intermediary, which may, for example, provide intermediation only for certain clients who have a particular subscription level of service.

If the intermediary decides not to intermediate in the secure session, it forwards the session request to the server in step 90, and the client and server can enter into a secure session with the server without any intermediation.

If the intermediary decides to intermediate, it sends a server-side session request to the server at step 92 and awaits a certificate from the server. After the intermediary receives the server certificate at step 94, it checks the validity of the certificate at step 96. If the intermediary does not accept the server certificate (for example, if the certificate is expired or is not signed by a trusted certification authority), then the secure session is aborted at step 98. If the intermediary does accept the server certificate, then the intermediary sends its certificate to the client at step 100 and waits for the client to respond. If the client accepts the intermediary certificate, the client and intermediary exchange session key data at step 102, and the intermediary and server exchange session key data at step 104. After the handshake protocol is successfully completed, the intermediary can intermediate secure communications between the client and server at step 106.

B. Single Client-Server Secure Session

Figure 7:
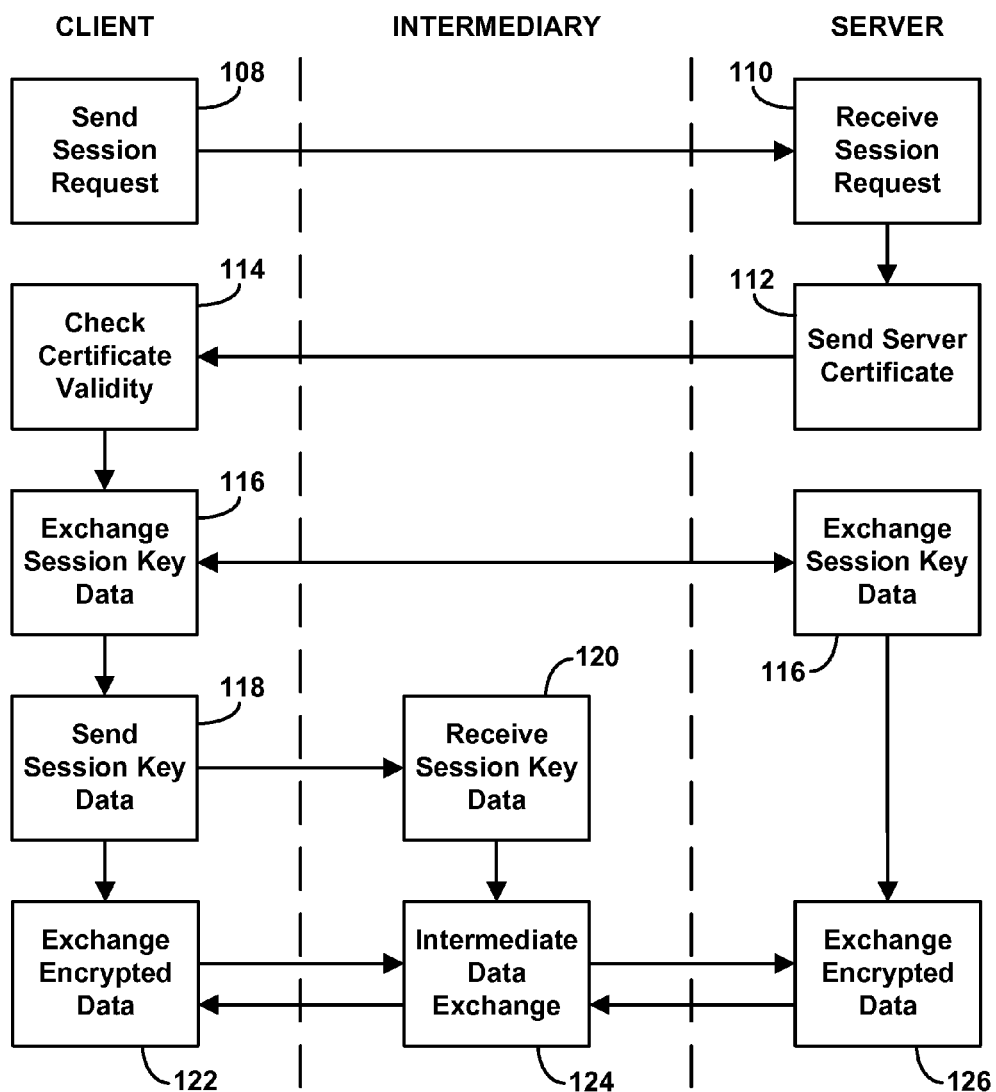
FIG. 7 is a logical flow diagram illustrating the establishment of a secure intermediation session in an invitation-mode embodiment.

In another embodiment, illustrated in FIG. 7, a single secure session is established between a client and a server, and an intermediary is then invited to intermediate in the secure session when a party to the session sends session key data to the intermediary. For example, the client and server may establish a conventional SSL session between them, but the client then sends session key data to the intermediary, allowing the intermediary to decrypt communications between the client and the server and to provide intermediation services.

To initiate a secure session, the client sends a request for a secure session to the server at step 108. The server receives the session request at step 110. The session request may have passed through the intermediary without being detected by the intermediary, or the intermediary may have detected the request but made an initial determination not to intermediate in the session (as in step 88 of FIG. 7). As in an ordinary SSL session, the server sends its certificate to the client (step 112), which then checks the certificate's validity (step 114), and the client and server exchange session key data (step 116).

Once the client and server establish an SSL session, the client invites the intermediary to intermediate in the secure session. At step 118, the client sends session key data to the intermediary. The session key data may include the master secret or the premaster secret encrypted by the intermediary's public key.

The security of the system may be enhanced when the client and the intermediary each operate a trusted computing platform, such as the Microsoft Palladium platform or the TCPA (trusted computing platform alliance) platform. To ensure that the session key data is not provided to an untrusted intermediary, the client may not send the session key to the intermediary unless the client and intermediary operate compatible trusted computing platforms.

The intermediary receives the session key data at step 120. Using the session key data, the intermediary creates session keys to encrypt and decrypt data exchanged along a communication path between the client and the server.

For example, at step 122, the client encrypts data with a session key and sends the data over the communication path, where it is received by the server. The intermediary decrypts the data with the session key and provides intermediation services at step 124. The server then links the client and server sessions by re-encrypting the data with the same session key and sending the data to the server. The server then decrypts the data with the session key at step 126.

This embodiment—intermediating in a secure session by invitation of one of the parties—can be implemented in a secure session in which the server requests authentication (such as a certificate) of the client. In some SSL sessions, after the client authenticates the server by checking the validity of the certificate, the server then requests authentication from the client. If the intermediary is attempting to set up two secure sessions as in the embodiment of Section 2.A, above, then the intermediary may be unsuccessful in authenticating itself to the server. For example, if the server requests a certificate and the intermediary sends its own certificate, the server may reject the certificate as not corresponding to the client. Likewise, if the server requests a certificate and the intermediary sends a certificate of the client, then the server may encrypt subsequent communications with the public key of the client, which the server will be unable to read unless it has (with the client's permission) a copy of the client's private key. This embodiment avoids these difficulties by allowing the client and server to enter into a single SSL session and exchange certificates as required.

Rather than requiring authentication of the intermediary as a part of the SSL handshake, the party inviting intermediation can request authentication of the intermediary before sending session key data to the intermediary in steps 118 and 120 to prevent an untrusted intermediary from getting hold of the session key data.

C. Single Server-Side Secure Session

Figure 8:
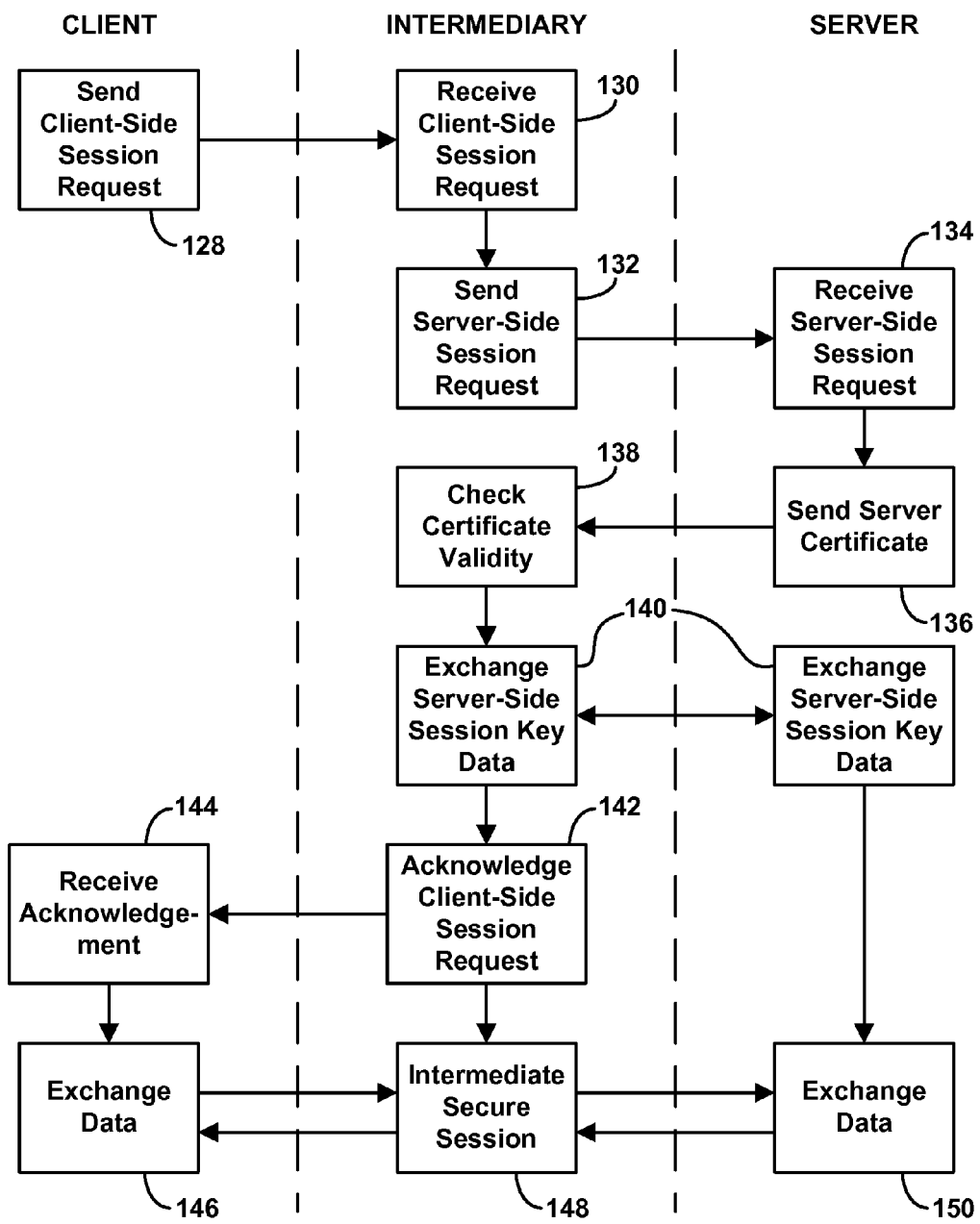
FIG. 8 is a logical flow diagram illustrating the establishment of a secure intermediation session in a server-side secure session embodiment.

In one embodiment, illustrated in FIG. 8, the intermediary establishes only a single secure session between the intermediary and the server. This embodiment may be implemented when a secure communications link is available between the client and the intermediary. For example, in one embodiment, the intermediary is associated with a mobile telecommunications service provider, and the client is a Web-enabled mobile telephone. In such an embodiment, radio communications may be established over a secure Code Division Multiple Access (CDMA) communications link, and wired communications may be conducted over a private network, rather than the public Internet. In this case, communications between the mobile telephone and the server may be sufficiently secure even without an SSL session between the client and intermediary. In particular, the additional computational load of operating an SSL section may not be worth the security gains for a mobile telephone, whose computational resources are already limited. A secure session between the client and intermediary may likewise be unnecessary where the client and the intermediary each operate compatible trusted computing platforms, such as the Microsoft Next Generation Secure Computing Base (NGSCB).

In this embodiment, the client sends a request for a secure session with the server in step 128. The request for a secure session may be, for example, sent to a URL of the intermediary. For example, the intermediary may operate a portal page through which the client may request intermediation of transactions with a retailer's Web site. The portal page may include hyperlinked text (such as a caption "Shop Securely at ACME Online Store") that a user may click to request a secure session with a server. Alternatively, or in addition, the portal page may include an HTML form in which a user can type a URL of a server with which the user wishes to communicate securely.

The intermediary detects the request for a secure session at step 130 and, at step 132, requests a secure session with the server. The server receives the session request at step 134 and sends its certificate to the intermediary at step 136. If the intermediary accepts the certificate as valid (step 138), the intermediary and server exchange session key data at step 140 to establish a secure session. After the secure session is established, at step 142, the intermediary sends an acknowledgement message to the client informing the client that a secure session has been established with the server, so that future communications sent from the client to the server will be encrypted by the intermediary before the communications are sent over the public Internet. The client receives the acknowledgement (step 144), and begins transmitting data to the server through the intermediary. The intermediary may provide intermediation services on the data (step 148) before encrypting the data and transmitting the data to the server. Conversely, encrypted data sent from the server to the client (step 150) is decrypted by the intermediary before being forwarded to the client.

In a variation on this embodiment, the intermediary provides no intermediation services on the data exchanged between the client and server in steps 146 and 150. Once the secure session between the intermediary and the server is established, the intermediary simply encrypts data sent by the client to the server and decrypts data sent by the server to the client. In this variation, the client is freed from the additional computational load of encryption and decryption in an SSL session.

D. Single Client-Side Secure Session

Figure 9:
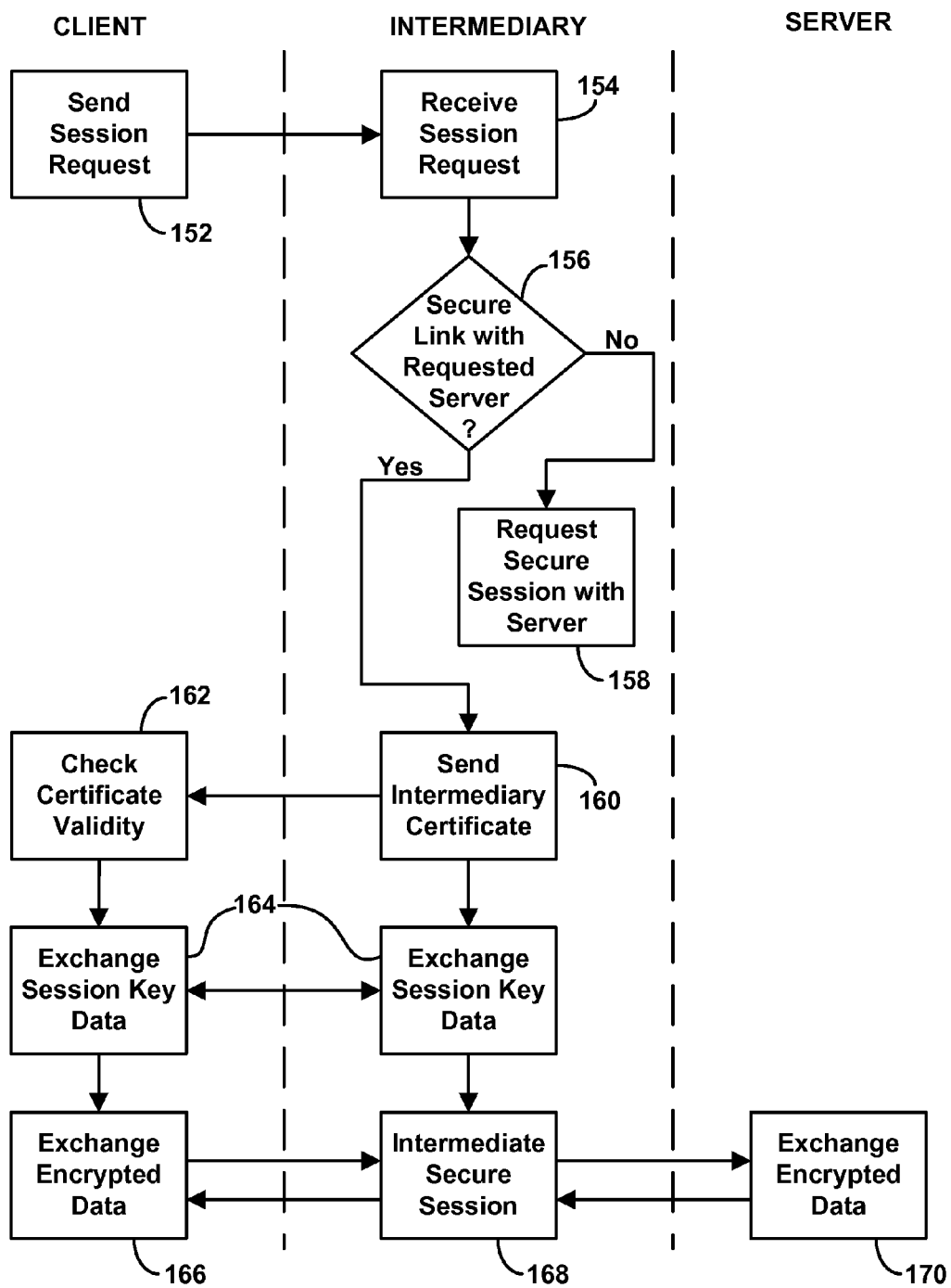
FIG. 9 is a logical flow diagram illustrating the establishment of a secure intermediation session in a client-side secure session embodiment.

In an embodiment illustrated in FIG. 9, the intermediary establishes a single secure session with the client without establishing a secure session with the server. This embodiment may be used, for example, when the intermediary and the server can exchange data over a secure communications channel.

The client sends a request for a secure session with the server in step 152, and the request is detected by the intermediary at step 154. At step 156, the intermediary determines whether it has a secure communications channel with the server requested by the client. The secure communications channel may be established over a private or leased-line connection between the intermediary and the server, or it may be a secure virtual connection (such as a virtual private network connection) established between the intermediary and the server.

If the intermediary does not have a secure communications link with the server, the intermediary may establish a secure session, such as an SSL session, with the server at step 158, as in the embodiment of FIG. 4. Otherwise, the intermediary sends its certificate to the client at step 160. The client checks the validity of the certificate at step 162 by determining whether it is a valid certificate either of the server or of the intermediary, and if the client accepts the certificate, the client and intermediary exchange session key data in step 164. When the client sends encrypted data addressed to the server (step 166), the intermediary decrypts the data and provides intermediation services in step 168. The intermediary then sends intermediated data along the secure communications channel with the server (step 170).

E. Additional Secure Session Variations

The embodiments described in sections 2.A through 2.D above are examples of intermediation protocols that can be implemented as described or with variations. One such variation is the use of cached certificates. In a handshake protocol leading to the establishment of a secure session, one party may request authentication by requesting a certificate of the other party. However, if the parties have entered into a secure session on an earlier occasion, the requesting party may already have a cached version of the other party's certificate. In that case, the other party does not need to send its certificate to the requesting party.

In some instances, a server may request authentication of the client. For example, the server may request the client's certificate. In one technique of providing authentication to the server, the intermediary receives the authentication request from the server. The intermediary then sends an authentication request to the client, requesting the client's certificate. The intermediary receives the certificate from the client and sends the certificate to the server in response to the server's authentication request. In an alternative technique, the intermediary stores a copy of the client's certificate and sends the stored certificate to the server in response to the server's authentication request.

III. General Intermediation Services

As discussed above, an intermediary provides intermediation services in a secure session between a client and a server. The intermediation services may involve modification of the data sent from the client to the server or of data sent from the server to the client, or the service may involve taking another action, such as recording selected data sent to the server.

To provide intermediation services, an intermediary receives data sent by the client (step 172). If the data is encrypted (step 174), the intermediary determines whether it has a session key to decrypt the data (step 176). If the intermediary does have a session key, then it decrypts the data in step 178.

On data that has been decrypted, or on the original data, if the original data was not encrypted, the intermediary determines in step 180 whether it should take any intermediation action. This determination may be made based on the presence of data that acts as an intermediation trigger. An intermediation trigger may be, for example, a credit card number associated with the client. For example, an individual who uses a client device may provide the intermediary with one or more credit card numbers to act as intermediation triggers, so that if data sent from the client includes a credit card number, the intermediary will perform an intermediation service at step 182, such as replacing the credit card number with a limited-use account number, as described in Section IV, below.

If the intermediary has a secure session with the server (step 184), the intermediated data is encrypted with a session key of the intermediary/server secure session at step 186 and sent to the server.

If the intermediary determines in step 174 that the data sent by the client is not encrypted, the intermediary may perform intermediation actions on the data without decrypting the data. Moreover, if the intermediary determines at step 184 that it does not have a secure session with the server, it can send the intermediated data to the server without encrypting the data. If the intermediary determines at step 174 that the data received from the client is encrypted, but the intermediary then determines in step 176 that it does not have a session key, the intermediary forwards the data to the server without performing any intermediation actions.

Figure 10:
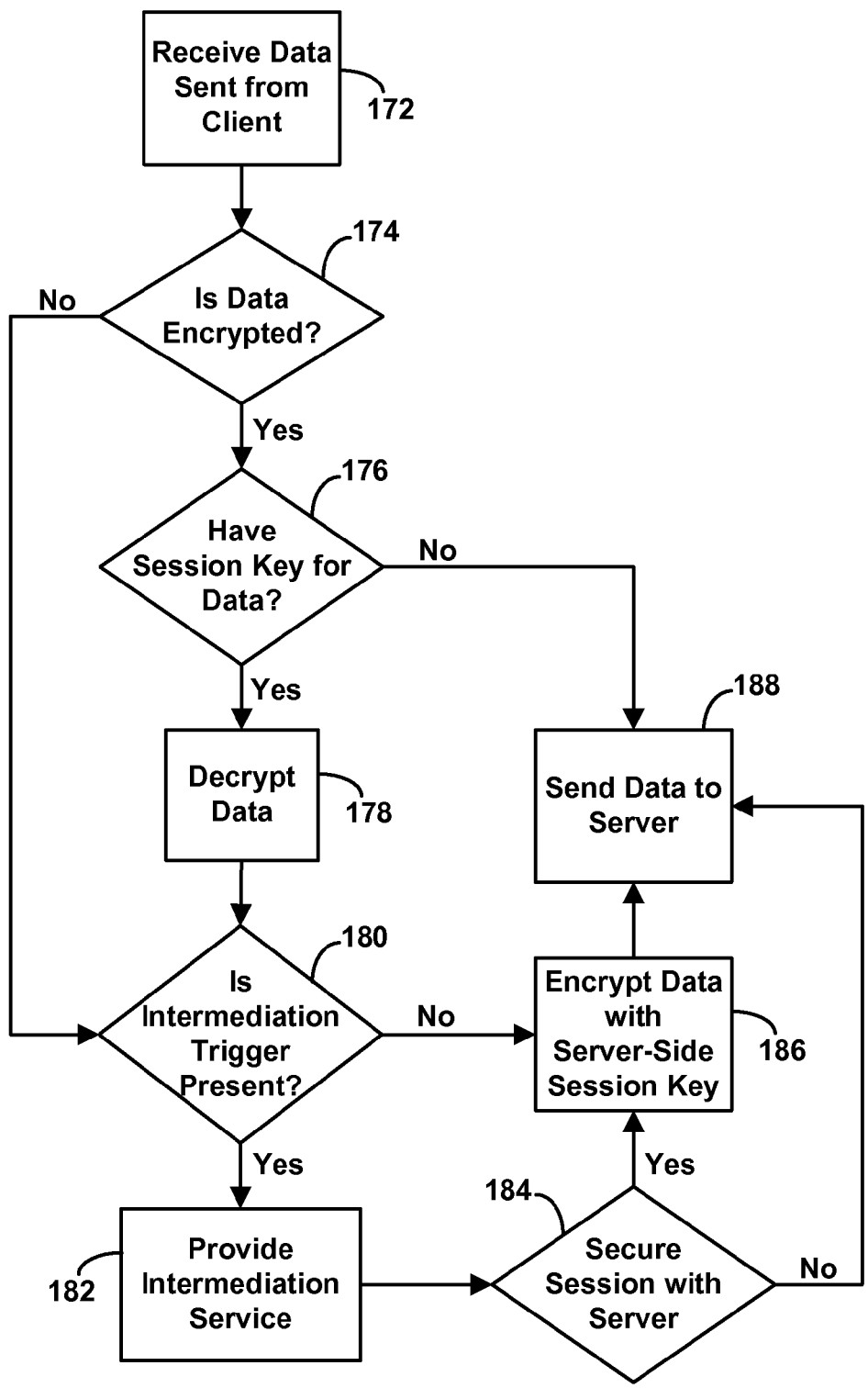
FIG. 10 is a logical flow diagram illustrating a secure intermediation method.

Although FIG. 10 illustrates intermediation actions performed on data sent from the client to the server, it should be noted that these actions may also be performed on data sent from the server to the client. The flow diagram of FIG. 10 may be implemented with the roles of client and server reversed.

Figure 11:
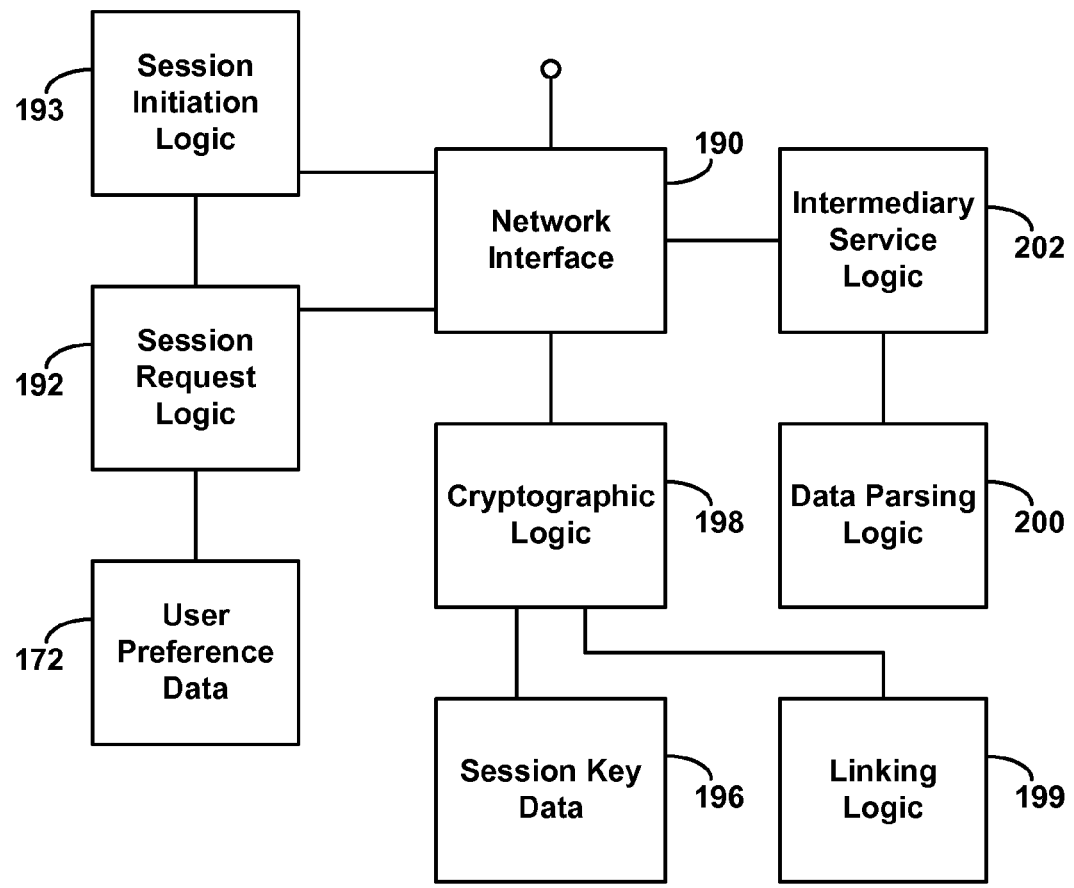
FIG. 11 is a schematic block diagram illustrating the components of a secure intermediary.

One embodiment of a secure intermediary is illustrated in FIG. 11. The intermediary includes a network interface 190 for managing communications with the client, server, and/or any other network nodes. The intermediary includes session request logic 192, which detects when a message sent by the client is a request for a secure session. The session request logic 192 may access a memory including user preference data 194. The user preference data stores data used by the intermediary to determine whether to intermediate in a secure session. For example, a user of a client device may provide to the intermediary an indication of when intermediation should be provided, such as a list of selected servers for which intermediation should be offered. The user preference data may be arranged as a database in which records listing the selected servers are indexed by user identifiers. In an embodiment in which the client devices are mobile telephone devices, the user identifiers may be electronic serial numbers or other identification numbers. In an embodiment in which the client devices are provided with static IP addresses, the user identifiers may be the clients' IP addresses.

If the session request logic 192 makes a determination that the intermediary should intermediate in a secure session, then session initiation logic 193 carries out the handshake protocol with the client and/or the server and stores session key data in a memory 196. Cryptographic logic 198 uses the session key data to encrypt and decrypt data exchanged in the secure session. Linking logic 199 directs data from one secure session to another. To link communications between a first and second network location, when data arrives at the intermediary from the first network location over a first secure session or other secure communication channel, the linking logic directs that data to the second network location over a second secure session or other communication channel.

Data parsing logic 200 monitors decrypted data to determine whether any intermediation trigger is present in the data. If an intermediation trigger is present, then intermediary service logic 202 provides an intermediation service.

The logic components of the intermediary of FIG. 11 may be implemented as software instructions stored in a computer memory and executed on a computer processor.

IV. Intermediating Credit Card Transactions

A. Overview of a Credit Card Intermediation Method

In one embodiment, the intermediation service provided by the intermediary is to substitute limited-use account numbers for credit card numbers in messages sent by a client. This intermediation ensures that a user's credit card number is not sent over the public Internet—even in an encrypted form. In this embodiment, the intermediation trigger is the presence of an account number in a message sent by the client.

Figure 12:
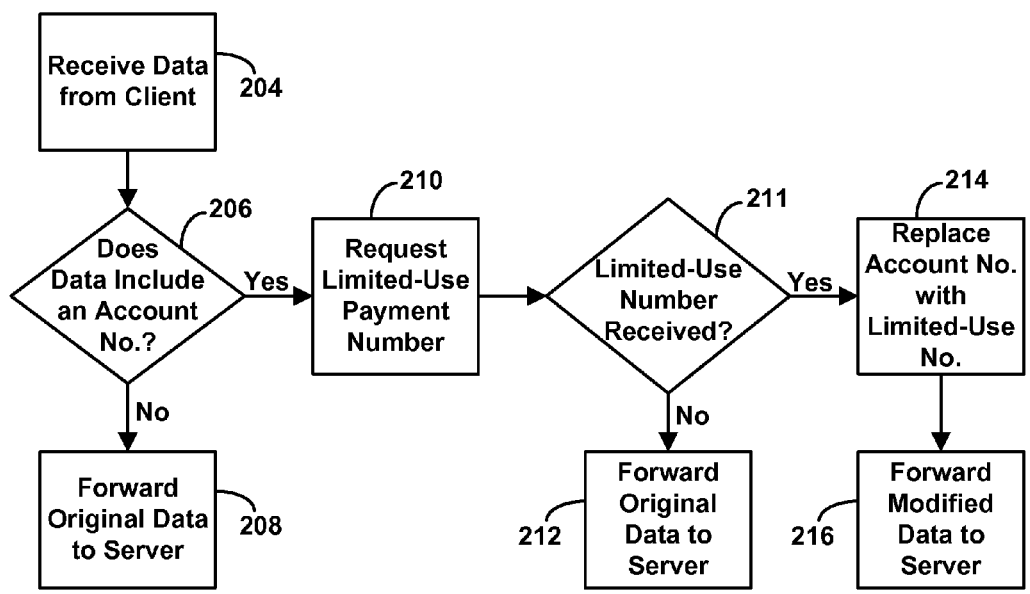
FIG. 12 is a logical flow diagram illustrating a limited-use payment number intermediation method.

To provide this intermediation service, an intermediary receives a message sent by the client at step 204 (FIG. 12). The intermediary determines at step 206 whether the message includes an account number, such as a credit card number. If the message does not include an account number, the intermediary forwards the data to the server at step 208. If the data does include an account number, then the intermediary requests a limited-use payment number in step 210. The request for a limited-use payment number may be sent to an external service provider, such as an account services provider associated with a credit card issuer.

If the intermediary is unsuccessful in receiving a limited-use payment number (step 211), it may forward the message to the server in step 212 without replacing the account number with the limited-use payment number. If the intermediary is successful in receiving a limited-use payment number, it replaces the account number in the message with the limited-use payment number in step 214. The modified message, including the limited-use payment number, is then sent to the server in step 216.

B. A Credit Card Intermediation System

1. The Network Interface

Figure 13:
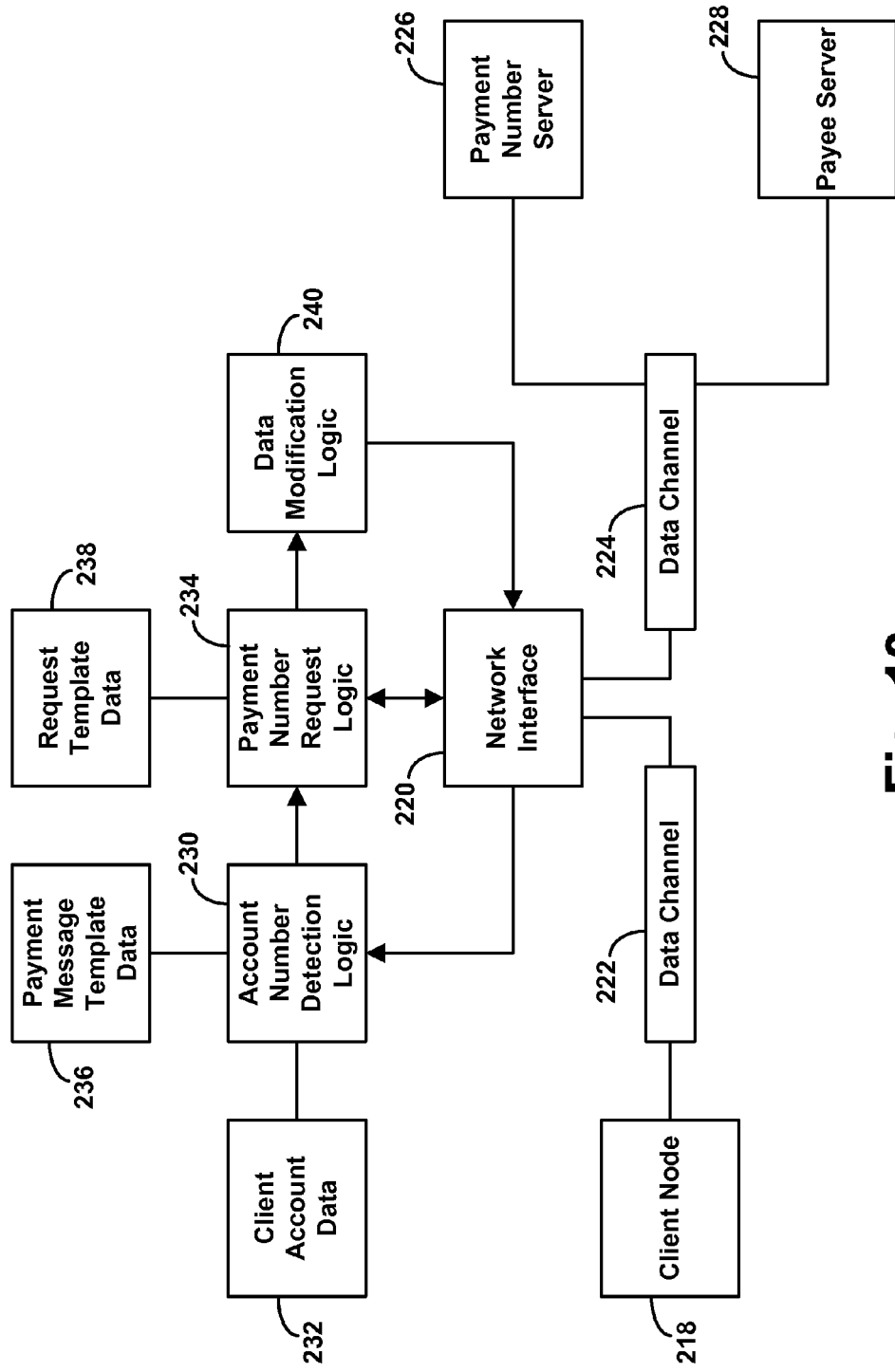
FIG. 13 is a schematic block diagram illustrating the logical architecture of a limited-use payment number intermediation system.

An intermediation system for converting account numbers to limited use payment numbers is illustrated in FIG. 13. An intermediation system includes a network interface 220. The network interface 220 communicates with a client node 218 over a first data channel 222. The first data channel 222 may include a 3G wireless network, and the client node 218 may be, for example, a Web-enabled mobile telephone operated by a consumer.

The network interface 220 communicates over a second data channel 224 with a payment number server 226 and a payee server 228. The second data channel 224 may include the public Internet and/or a private data connection. The payee server 228 may be, for example, a Web site of an on-line retailer. The payment number server 226 may be an external service provider such as a Web server associated with a credit card issuer.

2. Account Number Detection

The intermediary is provided with account number detection logic 230, which parses messages sent by the client node 218 to determine whether a message is a payment message that includes an account number. In an exemplary implementation, the client node 218 is in communication with the payee server 228 to consummate a purchase. Messages sent from the client node 218 are received at the network interface 220 before being forwarded to the payee server 228. The account number detection logic 230 at the intermediary detects whether the message sent from the client node 218 includes an account number, such as a credit card number.

The account number detection logic 230 may employ one or more of several techniques in detecting an account number. According to one embodiment, the account number detection logic 230 identifies account numbers by comparing data sent in the message from the client node with known account numbers stored as client account data 232. The client account data 232 may be a database that associates client nodes with account numbers. In this way, the intermediary replaces only preselected account numbers with limited-use payment numbers.

In a variation on this embodiment, the client account data 232 may store account numbers for which a user has chosen not to substitute limited-use payment numbers.

As an alternative to—or in combination with—the use of stored account numbers the account number detection logic may make use of other indicia in a message to determine whether the message includes an account number. For example, the account number detection logic 230 may detect whether a field in the message is provided with a label, such as "cardno" for example, that indicates that the following data is an account number. The account number detection logic 230 may further detect whether a message includes a sixteen-digit decimal number—the format for credit card numbers. It may also detect whether the message has, for example, data representing an expiration date, a price, or a quantity, or whether the message is sent in a secure session, or is sent to a URL of an on-line vendor, all of which tend to make it more likely that the sixteen-digit decimal number in the message is an account number. The account number detection logic 230 may then determine the presence of an account number based on these indicia.

In one embodiment, the account number detection logic 230 refers to payment message template data 236 to determine whether the message sent by the client node 218 is a payment message with an account number. The payment message template data 236 identifies the format of payment messages for various on-line vendors. For example, the Web site of an on-line vendor may request payment information from a buyer using an HTML form, which may result in the payment information being sent to the vendor using an HTTP GET or POST message. The format of the GET or POST message used by the vendor may be stored in the payment message template data 236 and may be associated with the address of the vendor Web site. When the intermediary receives a message addressed to the payee server 228, the account number detection logic 230 checks the payment message template data 236 to determine whether the message received matches a payment message format for the payee server 228. If so, the knowledge of the payment message format allows the account number detection logic 230 to identify the message as a payment message and to parse the message to identify the account number.

To identify an account number in a payment message, the account number detection logic 230 may, for example, parse messages to identify any sixteen-digit decimal numbers (the usual format for decimal numbers) in a message sent from a client node. The account number detection logic 230 may determine the identity of the account issuer by parsing the payment message to determine whether the payment message includes information identifying the account issuer, such as the text "Discover" or "Amex".

Not all messages that include an account number are payment messages, i.e., messages sent to consummate a payment. For example, a user may employ a client node 218 to visit the Web site of his credit card company to check his balance and, in the process, send his credit card number. The use of payment message template data 236 helps to ensure that a message is a payment message before an account number in the message is replaced with a limited-use payment number.

The use of the payment message template data 236 further enables the account number detection logic 230 to identify other information contained within a payment message, such as the identity of the payee, the amount of the payment, and the issuer of the account.

In one embodiment, the account number detection logic verifies that a user wishes an account number to be replaced with a limited-use payment number by sending a verification message to the client node after detecting an account number in a payment message. The verification message indicates to the user that the intermediary has detected an account number asks the user whether the account number should replaced with a limited-use payment number. The verification message may be sent to the client node as an e-mail message, a session initiation protocol (SIP) message, an instant message (IM), a short message service (SMS) message, or in another format. The user may respond to the message to indicate approval or disapproval of the replacement.

3. Payment Number Request

The intermediary is provided with payment number request logic 234 to manage requests for limited-use payment numbers. If the account number detection logic 230 determines that the message sent by the client node 218 is a payment message including an account number, then the payment number request logic 234 requests a limited-use payment number from the payment number server 226 through the network interface 220.

Where the issuer of the account has been determined by the account number detection logic 230, the payment number request logic 234 may send the payment number request to a Web server associated with the issuer of the account. In an exemplary embodiment, the payment number request specifies the account number sent by the client node 218, so that any payment made using the limited-use payment number is charged to the account identified by the account number.

The payment number request may further specify one or more limitations to be imposed on the use of the payment number. For example, the payment number request may specify the identity of the payee and/or the amount of the payment. In that way, the payment number server 226 can issue a payment number that may be used only for the identified payee and/or for no more than the specified amount of the payment. The payment number request may further specify a time limitation for the payment. For example, the request may specify that the limited-use payment number can be used only within three days from the time the payment number is issued. The limitations may be based on information—such as the payee and payment amount—determined by the account number detection logic 230. In an alternative embodiment, the time limitation and/or other limitations are determined by a credit card issuer and do not need to be sent in the payment number request.

Because different account issuers may use different formats for requesting a limited-use payment number, the payment number request logic 234 may consult request template data 238 to determine the format of the payment number request. Once the account number detection logic 230 has determined the identity of the account issuer, the payment number request logic 234 may consult the request template data 238 to determine the address of the payment number server 226 and the format of requests understood by the payment number server. In one embodiment, the payment number server 226 operates a Web page that uses HTML forms for the entry of information. In such an embodiment, requests are sent to the payment number server as HTTP GET or POST messages. In that case, the request template data 238 identifies the format of the GET or POST message sent to the payment number server. The request may be sent to the payment number server 226 in a secure session, such as an SSL session.

4. Data Modification

The intermediary is provided with data modification logic 240 to replace the account number in a payment message with a limited-use payment number.

If the intermediary receives a limited-use payment number in response to a payment number request (in an HTTP response message, for example), then the data modification logic replaces the account number in the payment message sent by the client node with an account number sent by the payment number server 226. If the intermediary requests and receives additional information from the payment number server, such as a revised credit card expiration date, the data modification logic 240 may modify that additional information in the payment message. In an embodiment in which the payment message sent by the client node 218 includes header information, such as "message length" information, the data modification logic 240 may revise the header information in accordance with other revisions to the payment message.

VI. Alternative Embodiments

The intermediary may be located at a variety of positions along a network. For example, the intermediary may be implemented in a proxy server associated with the client node.

The system described herein can be embodied with variations from the examples described above, and the details of those embodiments can be implemented with a variety of techniques. For example, each of the components of the intermediary, such as those illustrated in FIGS. 11 and 13, may be implemented as computer-executable software instructions stored in a computer memory and executable by a processor. The network interface may be implemented by a combination of hardware, such as a modem, and computer executable-instructions stored in a computer memory.

The embodiments described above should be understood to illuminate rather than limit the scope of the present invention. Features of the various embodiments can be interchanged and combined while keeping within the scope of the invention, as defined by the following claims.

The invention claimed is:

1. A secure intermediation method performed by an intermediary positioned along a communication path between a client node and a server node, comprising:
   receiving a session request from the client node, wherein the session request is a request to initiate secure communications between the client node and the server node;
   sending to the client node a certificate in response to the session request;
   establishing a first secure session between the client node and the intermediary;
   establishing a second secure session between the intermediary and the server node; and
   after establishing the first and second secure sessions, (i) receiving a payment message from the client node, (ii) detecting that the payment message includes an account number, (iii) modifying the payment message by replacing the account number with a limited-use payment number from a payment server, and (iv) sending the modified payment message to the server node over the second secure session.

2. The method of claim 1, wherein the first and second secure sessions are secure socket layer sessions.

3. In a secure intermediation system, a method comprising:
   sending from a client node a session request addressed to a server node, wherein the session request comprises a request to initiate a secure socket layer session between the client node and the server node;
   receiving at the client node a certificate in response to the session request;
   determining at the client node that the certificate corresponds to an intermediary positioned along a communications path between the client node and the server node;
   establishing a first secure session between the client node and the intermediary;
   establishing a second secure session between the intermediary and the server node;
   receiving at the intermediary from the client node a payment message including an account number;
   modifying the payment message at the intermediary by replacing the account number with a limited-use payment number received from a payment server; and
   sending the modified payment message from the intermediary to the server node.

4. An intermediation system comprising:

a processor for executing logic;

session request logic executable on the processor and operative to detect a session request sent from a client node, wherein the session request comprises a request to initiate a secure session between the client node and a server node;

session initiation logic executable on the processor and operative to establish a first secure session with the client node and a second secure session with the server node, the session initiation logic being responsive to the detection of the session request by the session request logic;

linking logic executable on the processor and operative to enable communication between the client node and the server node by linking the first secure session with the second secure session;

account-number detection logic executing on a processor and operative to determine that a message sent by the client node is a payment message that includes an account number;

payment number request logic executing on a processor and operative to request a limited-use payment number from a payment server; and modification logic executing on a processor and operative to modify the payment message by replacing the account number with the limited-use payment number.

5. The system of claim 4, wherein the first and second secure sessions are secure socket layer sessions.

6. A secure intermediation system, comprising:

a network interface;

a processor; and data storage, wherein the data storage stores instructions executable by the processor (i) to receive a session request from a client node, wherein the session request comprises a request to initiate secure communications between the client node and a server node; (ii) to establish a first secure session with the server in response to receiving the session request; (iii) to establish a second secure session between the intermediary and the server in response to receiving the session request; (iv) to receive a payment message from the client node after establishing the first and second secure session, wherein the payment message includes an account number; (v) to modify the payment message by replacing the account number with a limited use payment number received from a payment server, and (vi) to send the modified payment message to the server over the second secure session.

7. The method of claim 1, wherein the account number is a credit card number.

8. The method of claim 1, further comprising sending a verification message to the client node after detecting the payment message includes the account number, wherein the verification message prompts a user of the client node to approve replacement of the account number.

9. The method of claim 1, further comprising requesting the limited- use payment number from said payment server.

10. The method of claim 3, wherein the account number is a credit card number.

11. The method of claim 3, further comprising sending a verification message to the client node to prompt a user of the client node to approve replacement of the account number.

12. The method of claim 3, further comprising requesting the limited- use payment number from said payment server.

13. The system of claim 4, wherein the account number is a credit card number.

14. The system of claim 4, wherein the account-number detection logic is further operative to send a verification message to the client node to prompt a user of the client node to approve replacement of the account number.

15. The system of claim 6, wherein the account number is a credit card number.

16. The system of claim 6, wherein the instructions are further executable by the processor to send a verification message to the client node to prompt a user of the client node to approve replacement of the account number.

17. The system of claim 6, wherein the instructions are further executable by the processor to request the limited-use payment number from said payment server.

* * * * *

UNITED STATES PATENT AND TRADEMARK OFFICE
CERTIFICATE OF CORRECTION

| | |
|---|---|
| PATENT NO. | : 7,853,782 B1 |
| APPLICATION NO. | : 10/824236 |
| DATED | : December 14, 2010 |
| INVENTOR(S) | : Martin Geddes |

Page 1 of 1

It is certified that error appears in the above-identified patent and that said Letters Patent is hereby corrected as shown below:

In the Drawings

Sheet 5, Fig. 5, in block 80, please delete "Server" and replace with --Intermediary--.

Sheet 9, Fig. 9, please delete the connector between block 160 and block 164.

Sheet 10, Fig. 10, in decision-block 184, please insert --?-- after "Secure Session with Server".

Sheet 11, Fig. 11, please replace reference numeral "172" with reference numeral --194--.

Signed and Sealed this
Twenty-ninth Day of March, 2016

Michelle K. Lee
*Director of the United States Patent and Trademark Office*